United States Patent
Jahn

(10) Patent No.: US 6,533,218 B1
(45) Date of Patent: Mar. 18, 2003

(54) RECONNAISSANCE POD WITH MOVABLE SENSOR-BAY WINDOW

(75) Inventor: Michael D. Jahn, Indianapolis, IN (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/644,956

(22) Filed: Aug. 23, 2000

Related U.S. Application Data

(60) Provisional application No. 60/161,980, filed on Oct. 28, 1999.

(51) Int. Cl.$^7$ .............................................. B64D 47/08
(52) U.S. Cl. ................... 244/1 R; 244/3.16; 244/137.4; 244/118.1; 359/556; 348/113
(58) Field of Search ............................. 244/1 R, 137.4, 244/3.16, 3.17, 3.18, 118.1, 121; 359/556, 554, 555; 396/12, 427; 250/203.5–203.7, 347, 235, 203.1; 348/113, 144

(56) References Cited

U.S. PATENT DOCUMENTS

| | | | | |
|---|---|---|---|---|
| 2,214,722 A | * | 9/1940 | Seversky | 244/129.3 |
| 2,955,518 A | * | 10/1960 | Perry | |
| 3,739,699 A | * | 6/1973 | Colterjohn et al. | |
| 3,924,826 A | * | 12/1975 | Reinert | 244/129.3 |
| 4,746,082 A | * | 5/1988 | Syms et al. | 244/137.4 |
| 4,887,779 A | * | 12/1989 | Large | 244/1 R |
| 5,184,521 A | * | 2/1993 | Tyler | 248/612 |
| 5,765,043 A | * | 6/1998 | Tyler | 396/12 |
| 5,927,648 A | * | 7/1999 | Wookland | 244/118.1 |

FOREIGN PATENT DOCUMENTS

FR 2618122 * 1/1989 ................ 244/1 R

OTHER PUBLICATIONS

Johnson, "Optical engineering of first and second generation automtic tracking/laser designator pods" pp 37–376, 1979.*

* cited by examiner

Primary Examiner—Galen L. Barefoot
(74) Attorney, Agent, or Firm—William C. Schubert; Glenn H. Lenzen, Jr.

(57) ABSTRACT

A reconnaissance pod for viewing a scene has a structural backbone extending generally parallel to a pod axis, a forward housing affixed to the backbone, and an aft housing affixed to the backbone. The aft housing is separated from the forward housing along the pod axis. A central housing is mounted between the forward housing and the aft housing along the pod axis. The central housing includes a central body, a window through the central body, and at least a portion of a sensor assembly supported within the central housing from the forward housing and/or the aft housing. A rotational drive assembly has a forward support rotationally supporting the central body from the forward housing, with a forward bearing oriented to permit rotation of the central housing about the pod axis. The rotational drive assembly also includes an aft support rotationally supporting the central body from the aft housing, with an aft bearing oriented to permit rotation of the central housing about the pod axis. A controllable actuator drives the rotation of the central housing about the pod axis on the forward bearing and the aft bearing.

21 Claims, 2 Drawing Sheets

RECONNAISSANCE POD WITH MOVABLE SENSOR-BAY WINDOW

This application claims the benefit of Ser. No. 60/161,980, filed Oct. 28,1999

BACKGROUND OF THE INVENTION

This invention relates to a reconnaissance pod within which a sensor is mounted, and, more particularly, to such a reconnaissance pod that is mountable to an aircraft.

An optical sensor receives radiated energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. The optical sensors generally employ a photosensitive material that faces the scene and produces an electrical output responsive to the incident energy. The photosensitive material and remainder of the sensor structure are rather fragile, and are easily damaged by dirt, erosion, chemicals, or high air velocity. In service, the sensor is placed behind a window through which it views the scene and which protects the sensor from such external effects. The window must be transparent to the radiation of the operating wavelength of the sensor and must resist attack from the external forces. The window must also permit the sensor to view the scene over the specified field of regard.

In one sensor application, the sensor is enclosed in a pod that is affixed to the underside of an aircraft, and the window is provided through the wall of the pod. The sensor is directed generally downwardly but may be moved from side to side (termed the azimuthal direction) to view a scene on either side of the aircraft's ground path and also to permit the sensor to remain aimed at a specific portion of the scene when the aircraft banks. The window must be large enough to view the required field of regard.

Windows extending over a large azimuthal angle, such as the range of −30 degrees to +30 degrees relative to the aircraft centerline, are expensive to produce and may suffer from irregularities that degrade the image quality at particular pointing angles. The shutter system required to protect the window when the sensor is not in use is large, heavy, and complex. In some cases, the window may be segmented into a number of panes to reduce the cost and the presence of irregularities, but the problems remain to some extent and there are problems introduced by the segmentation of the window.

There is a need for an improved approach to a sensor pod in which the window allows a large side-to-side field of regard of the sensor, but overcomes the problems with prior approaches. The present invention fulfills this need, and further provides related advantages.

SUMMARY OF THE INVENTION

The present invention provides a reconnaissance pod that may be carried below an aircraft. The reconnaissance pod allows a wide azimuthal field of regard of the sensor assembly in the pod, but utilizes a relatively small window which may be made of the highest optical-quality material to ensure high image quality of the sensor. No protective shutter system is required, reducing weight and complexity and also providing maximum usable space within the reconnaissance pod for the sensor assembly. The reconnaissance pod has a good aerodynamic shape and performance. The reconnaissance pod is less expensive to produce than a pod having a large window size. The reconnaissance pod is fully self-contained, except for electrical leads extending to the aircraft.

In accordance with the invention, a reconnaissance pod for viewing a scene comprises a structural backbone extending generally parallel to a pod axis, a forward housing affixed to the backbone, and an aft housing affixed to the backbone. The aft housing is spaced apart from the forward housing along the pod axis. A central housing is mounted between the forward housing and the aft housing. The central housing includes a central body, and a window through the central body and affixed to the central body. The window is controllably movable relative to the backbone between a first position and a second position.

Preferably, the central housing is substantially cylindrical having the pod axis as its cylindrical axis. The central housing is supported on the forward housing and on the aft housing, but not directly on the backbone. Desirably, the central housing is rotationally supported on the forward housing and on the aft housing, so that the window is rotatable about the pod axis. At least a portion of a sensor assembly is typically supported within the central housing.

In a preferred approach, the structural backbone also includes an attachment adapted for affixing the structural backbone to an aircraft mounting site. The forward housing and the aft housing are aerodynamically tapered. The forward housing may further comprise a radar transceiver, and a radome through which the radar transceiver transmits and receives a radar beam.

In one embodiment, a reconnaissance pod comprises a structural backbone extending generally parallel to a pod axis, a forward housing affixed to the backbone, and an aft housing affixed to the backbone, with the aft housing being separated from the forward housing along the pod axis. A central housing, mounted between the forward housing and the aft housing along the pod axis, includes a central body, a window through the central body and affixed to the central body, with the central body and the window together being substantially cylindrical about the pod axis. At least a portion of a sensor assembly is supported within the central housing from at least one of the forward housing and the aft housing. A rotational drive assembly comprises a forward support rotationally supporting the central body from the forward housing, wherein the forward support includes a forward bearing oriented to permit rotation of the central housing about the pod axis. The rotational drive assembly also includes an aft support rotationally supporting the central body from the aft housing, wherein the aft support includes an aft bearing oriented to permit rotation of the central housing about the pod axis. A controllable drive motor is operable to drive the rotation of the central housing about the pod axis on the forward bearing and the aft bearing.

In this configuration, the reconnaissance pod may be made with the forward and aft housing having tapered aerodynamic shapes, and the central housing is substantially cylindrical. This reconnaissance pod has excellent aerodynamics, introduces minimal drag to the aircraft, and does not introduce asymmetric drag to the aircraft.

Typically, the rotational drive assembly further includes a drive engagement, such as a cable drive engagement, between the drive motor and the central housing. There is a forward seal between the forward housing and the central housing, and an aft seal between the aft housing and the central housing. The forward bearing and/or the aft bearing may include an elastomeric mount to accommodate flexing of the backbone and thence the housing assembly during service.

During service, the sensor controller points the sensor to different azimuthal angles as may be required during the viewing of a scene. The azimuthal angle may be changed to view a different portion of the scene, or to remain trained on a single portion of the scene when the aircraft banks. The actuator that rotates the central housing is controlled to move the window, by rotating the central housing about the pod axis in the preferred embodiment, so that the window remains in the line of sight of the sensor to the viewed portion of the scene. The window itself may be made relatively small in azimuthal extent using this approach, so that the window may be made relatively inexpensively yet with high optical quality.

When the sensor is out of operation, the central housing and its window are rotated so that the window faces upwardly into the backbone. The window is thereby protected from damage due to external causes by the fuselage of the aircraft.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
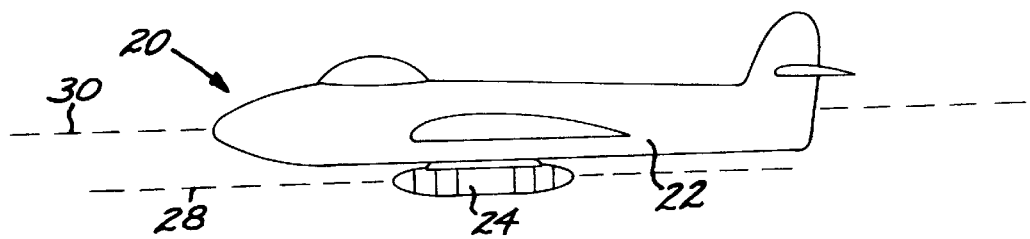
FIG. 1 is a side elevational view of a reconnaissance pod mounted to the underside of an aircraft.
Figure 2:
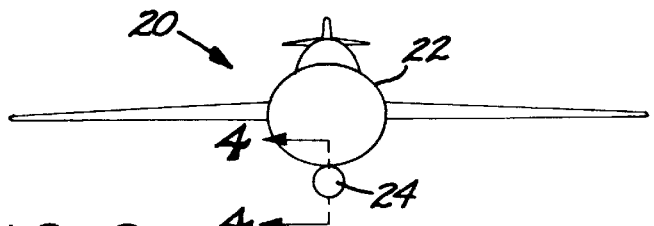
FIG. 2 is a front view of the aircraft and reconnaissance pod of FIG. 1.

FIGS. 1–2 depict an aircraft 20 having a fuselage 22 and other conventional aircraft components and structure. The aircraft 20 may be manned or unmanned. A reconnaissance pod 24 is supported below the aircraft, in this case below its fuselage 22 and along the transverse centerline of the aircraft 20. The reconnaissance pod 24 has an aerodynamic shape to promote good speed and range of the aircraft, and well as good maneuverability.

Figure 3:
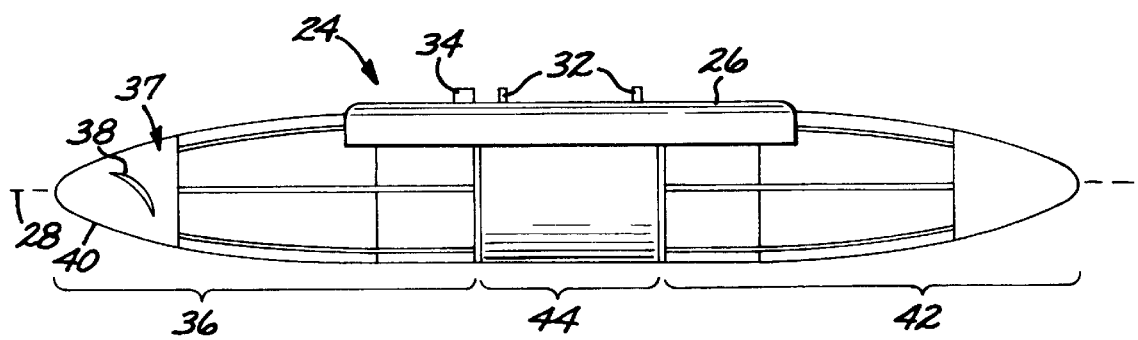
FIG. 3 is an enlarged side elevational view of the reconnaissance pod of FIG. 1.

FIG. 3 illustrates the reconnaissance pod 24 in greater detail. The reconnaissance pod 24 includes a structural backbone 26 that, like the reconnaissance pod 24, is elongated and extends generally parallel to a pod axis 28. (The backbone 26 is sometimes termed a "strongback".) When the reconnaissance pod is attached to the aircraft 20, the pod axis 28 is substantially parallel to an axis of elongation 30 of the fuselage 22. The structural backbone 26 is a strong spar-like structure of sufficient strength and rigidity to support the remainder of the reconnaissance pod 24, as will be discussed. The structural backbone 26 is typically made of an aluminum alloy or a composite material such as a graphite-epoxy composite material. The backbone 26 is of sufficient length to provide attachment to the forward and aft housings, discussed subsequently. The backbone 26, and thence the remainder of the reconnaissance pod 24, is removably attached to the fuselage by mechanical fasteners 32, of conventional design. A disconnectable electrical umbilical connector 34 is also provided for electrical communication between the aircraft 20 and the reconnaissance pod 24. The fasteners 32 and connector 34 are configured to allow a conventional attachment and removal, and may also be configured to allow the reconnaissance pod 24 to be dropped and jettisoned during flight in the event of an emergency.

A forward housing 36, extending generally parallel to the pod axis 28, is affixed to the backbone 26. The forward housing 36, which faces forwardly when the reconnaissance pod 24 is mounted to the aircraft 20, desirably has an aerodynamic shape, typically ogival, conical, or tapered. The forward housing 36 may contain therein reconnaissance equipment 37, such as a radar antenna 38 that operates through a radome 40 that is part of the forward housing 36.

An aft housing 42, extending generally parallel to the pod axis 28, is affixed to the backbone 26. The aft housing 42 is separated from the forward housing 36 along the pod axis 28. The aft housing 42, which faces rearwardly when the reconnaissance pod 24 is mounted to the aircraft 20, also desirably has an aerodynamic shape, typically conically tapering to a pointed rear end. The aft housing 42 may contain reconnaissance equipment or other apparatus.

Externally, the forward housing 36 and the aft housing 42 are preferably generally cylindrically symmetric about the pod axis 28. The forward housing 36 and the aft housing 42 are made of conventional materials, such as aluminum alloy or a composite material.

A central housing 44, extending generally parallel to the pod axis 28, is mounted between the forward housing 36 and the aft housing 42 along the pod axis. The central housing 44 and its relationship to the forward housing 36 and the aft housing 42 are shown in greater detail in FIG. 4. The central housing 44 includes a central body 46 that is made of conventional materials, such as aluminum alloy or a composite material. The central housing 44 is not attached directly to the backbone 26, but instead is attached to the forward housing 36 and the aft housing 42, as will be discussed subsequently.

There is a window 48 through the central body 46 and affixed to the central body 46 by an attachment and seal 50. Externally, the central body 46 and the window 48 are together substantially cylindrically symmetric about the pod axis 28, except that the central body 46 may be selectively tapered around the window 48, as indicated at numeral 52. The window 48 is made of a material that is transparent to the wavelength being sensed therethrough by a sensor assembly 54 mounted inside the bay of the central housing 44. The sensor assembly 54 includes an optical telescope 56 that is pointed through the window 48. Sensor assemblies 54 and associated transparent windows 48 are known in the art for wavelengths from the ultraviolet, through the visible, and into the infrared.

In the preferred design, the forward housing 36 has a forward housing bulkhead 58 at its rearward end, and the aft housing 42 has an aft housing bulkhead 60 at its forward end. Because the forward housing 36 and the aft housing 42 are attached directly to the backbone 26, the forward housing bulkhead 58 and the aft housing bulkhead 60 are also attached directly to the backbone 26.

The sensor assembly 54 is attached to the forward housing bulkhead 58 and/or to the aft housing bulkhead 60. In the illustrated case, the sensor assembly 54 is attached to both the forward housing bulkhead 58 and the aft housing bulkhead 60 by a gimbal attachment 62 that permits the sensor assembly 54 to be controllably rotated about the pod axis 28. The telescope 56 is thereby aimed at a particular portion of interest of a scene in a selected azimuthal direction, usually by a controller located in the aircraft 20 or remotely. While the preferred construction and support for the sensor assembly 54 have been described, other operable approaches may be used. For example, only a portion of the sensor assembly 54 may be located within the central housing 44, with other portions located in the forward housing 36 and/or the aft housing 42.

Figure 4:
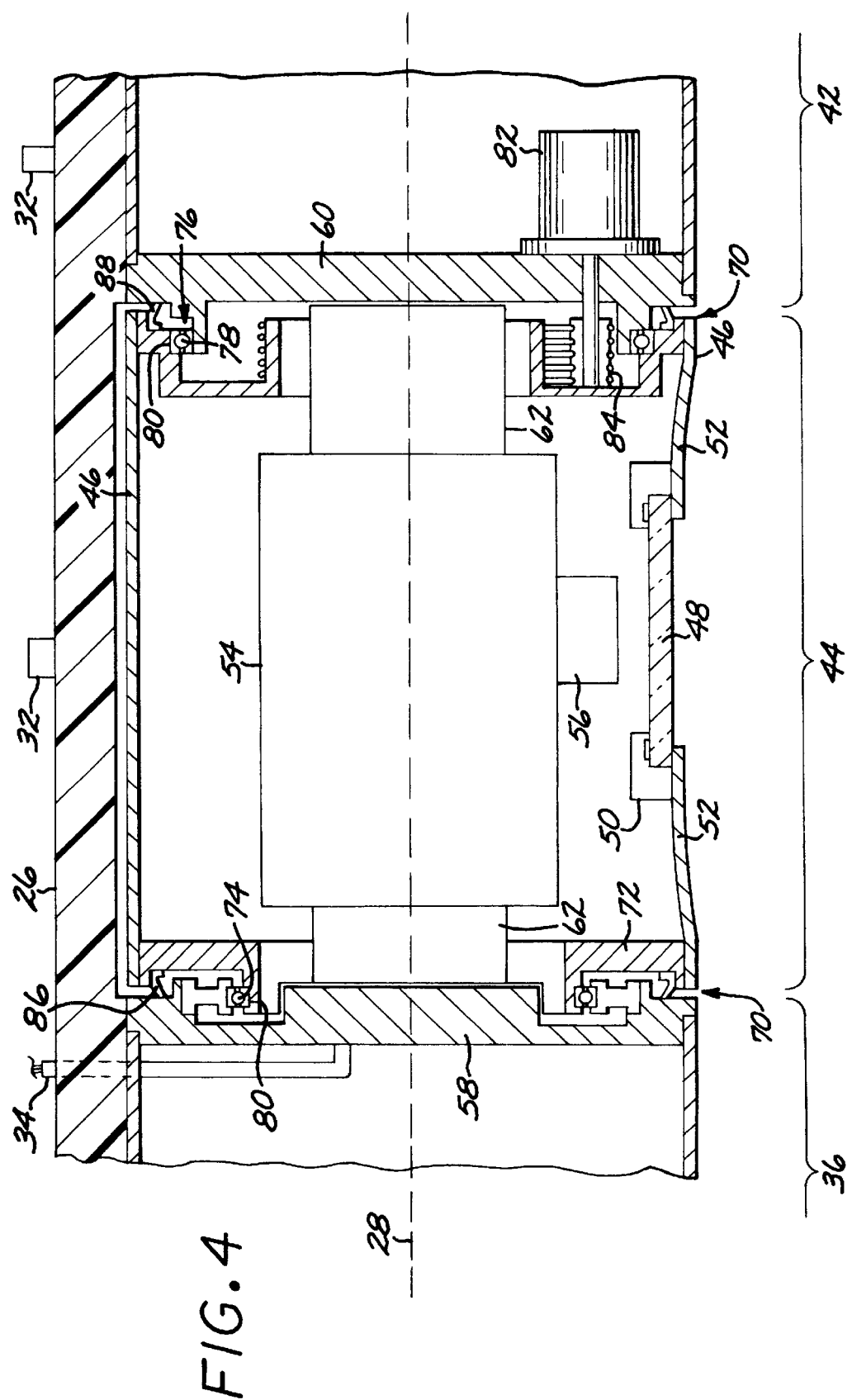
FIG. 4 is an enlarged side sectional view of the reconnaissance pod of FIG. 1–3, taken along line 4—4 of FIG. 2.

The window 48 is controllably movable relative to the backbone 26 between a first position and a second position, and typically among many positions. A preferred support for the central body 46 and the window 48 which achieves such movement is illustrated in FIG. 4.

A rotational drive assembly 70 comprises a forward support 72 which rotationally supports the central body 46 from the forward housing 36. The forward support 72 includes a forward bearing 74 oriented to permit rotation of the central housing 44 about the pod axis 28. The rotational drive assembly 70 further comprises an aft support 76 rotationally supporting the central body 46 from the aft housing 42. The aft support 76 includes an aft bearing 78 oriented to permit rotation of the central housing 44 about the pod axis 28 coaxially with the rotation produced by the forward bearing 74. Each of the bearings 74 and 78 is preferably a large-diameter roller bearing of nearly as large a diameter as that of the central body 46, in order to provide stable support between the central body 46, on the one hand, and the forward housing 36 and the aft housing 42, respectively, on the other hand. One or both of the bearings 74 and 78 may be mounted in an elastomeric support material 80 that allows some movement in the supports 72 and 76 to accommodate flexing and bending of the reconnaissance pod 24. Any operable elastomeric support material, such as rubber, may be used.

A controllable actuator 82 is operable to drive the rotation of the central housing 44 about the pod axis 28 on the forward bearing 74 and the aft bearing 78. The controllable actuator 82 is preferably an electric motor, as illustrated, although any operable actuator may be used. The actuator 82 is linked to the central housing 44 by a drive engagement 84. In the illustrated embodiment, the drive engagement 84 is a cable drive extending between the spindle of the motor and a drum 86 on the central housing 44. Other operable drive engagements such as a worm drive may instead be used.

A circumferentially extending forward seal 86 is provided to seal the gap between the forward housing 36 and the central housing 44 against intrusion of air, rain, dust, chemicals, and the like. Similarly, a circumferentially extending aft seal 88 is provided to seal the gap between the aft housing 42 and the central housing 44. The seals 86 and 88 are preferably made of an elastomer such as rubber.

In operation, the telescope 56 of the sensor assembly 54 is rotated on its gimbal attachment 62 from side to side (the azimuthal direction) about the pod axis 28, either to view different parts of a scene passing below the aircraft, or to remain fixed on a selected portion of the scene when the aircraft banks. Simultaneously, the central housing 44 is rotated about the pod axis 28 to the same azimuthal position as the telescope 56, so that the telescope 56 is always pointed through the window 48. The simultaneous rotation of the gimbal attachment 62 and the central housing 44 is achieved by a single controller electrically controlling both the drive of the gimbal attachment 62 and the actuator 82. When the sensor assembly 54 is not to be used, the controller rotates the central housing 44 to a position so that the window 48 faces upwardly toward the underside of the backbone 26.

The window 48 is thereby shielded and protected against damage by flying objects, rocks encountered at takeoff and landing, and the like.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A reconnaissance pod for viewing a scene, comprising:
   a structural backbone extending generally parallel to a pod axis;
   a forward housing affixed to the backbone;
   an aft housing affixed to the backbone, the aft housing being spaced apart from the forward housing along the pod axis; and
   a central housing mounted between the forward housing and the aft housing, the central housing including
      a central body, and
      a window through the central body and affixed to the central body, the window being made of a material that is transparent to a wavelength of energy, the window being controllably movable relative to the backbone between a first position and a second position.

2. The pod of claim 1, wherein the structural backbone includes an attachment adapted for affixing the structural backbone to an aircraft mounting site.

3. The pod of claim 1, wherein the forward housing and the aft housing are aerodynamically tapered.

4. The pod of claim 1, wherein the forward housing further comprises
   a radar transceiver, and
   a radome through which the radar transceiver transmits and receives a radar beam.

5. The pod of claim 1, wherein the central housing is substantially cylindrical having the pod axis as its cylindrical axis.

6. The pod of claim 1, wherein the central housing is supported on the forward housing and on the aft housing, but not directly on the backbone.

7. The pod of claim 1, wherein the central housing is rotationally supported on the forward housing and on the aft housing, so that the window is rotatable about the pod axis.

8. The pod of claim 1, further including
   at least a portion of a sensor assembly supported within the central housing.

9. The pod of claim 1, wherein the structural backbone includes an attachment adapted for affixing the structural backbone to an aircraft mounting site such that the structural backbone is below the aircraft.

10. A reconnaissance pod comprising:
    a structural backbone extending generally parallel to a pod axis;
    a forward housing affixed to the backbone;
    an aft housing affixed to the backbone, the aft housing being separated from the forward housing along the pod axis;
    a central housing mounted between the forward housing and the aft housing along the pod axis, the central housing including
       a central body,
       a window through the central body and affixed to the central body, the central body and the window together being substantially cylindrical about the pod axis, and at least a portion of a sensor assembly supported within the central housing from at least one of the forward housing and the aft housing; and a rotational drive assembly comprising a forward support rotationally supporting the central body from the forward housing, the forward support including a forward bearing oriented to permit rotation of the central housing about the pod axis, an aft support rotationally supporting the central body from the aft housing, the aft support including an aft bearing oriented to permit rotation of the central housing about the pod axis, and a controllable actuator operable to drive the rotation of the central housing about the pod axis on the forward bearing and the aft bearing.

11. The pod of claim 10, wherein the forward housing and the aft housing are aerodynamically tapered.

12. The pod of claim 10, wherein the forward housing further comprises a radar transceiver, and a radome through which the radar transceiver transmits and receives a radar beam.

13. The pod of claim 10, wherein the rotational drive assembly further includes a drive engagement between the actuator and the central housing.

14. The pod of claim 10, wherein the rotational drive assembly further includes a cable drive engagement between the actuator and the central housing.

15. The pod of claim 10, further including a forward seal between the forward housing and the central housing, and an aft seal between the aft housing and the central housing.

16. The pod of claim 10, wherein at least one of the forward bearing and the aft bearing includes an elastomeric mount.

17. The pod of claim 10, wherein the structural backbone includes an attachment adapted for affixing the structural backbone to an aircraft mounting site.

18. The pod of claim 9, wherein the sensor assembly senses a wavelength of radiation, and wherein the window is made of a material that is transparent to the wavelength of radiation sensed by the sensor assembly.

19. The pod of claim 9, wherein the structural backbone includes an attachment adapted for affixing the structural backbone to an aircraft mounting site such that the structural backbone is below the aircraft.

20. A reconnaissance pod for viewing a scene, comprising:

a structural backbone extending generally parallel to a pod axis, the structural backbone including an attachment adapted for affixing the structural backbone to an aircraft mounting site such that the structural backbone is below the aircraft;

a forward housing affixed to the backbone;

an aft housing affixed to the backbone, the aft housing being spaced apart from the forward housing along the pod axis; and a central housing supported upon and between the forward housing and the aft housing, but not directly on the backbone, the central housing including a central body, a sensor assembly that senses a sensor wavelength of energy, and a window through the central body and affixed to the central body, the window being made of a material that is transparent to the sensor wavelength of energy, the window being controllably movable relative to the backbone between a first position and a second position.

21. The pod of claim 20, wherein the central housing is rotationally supported on the forward housing and on the aft housing, so that the window is rotatable about the pod axis.

* * * * *